Patented June 30, 1931

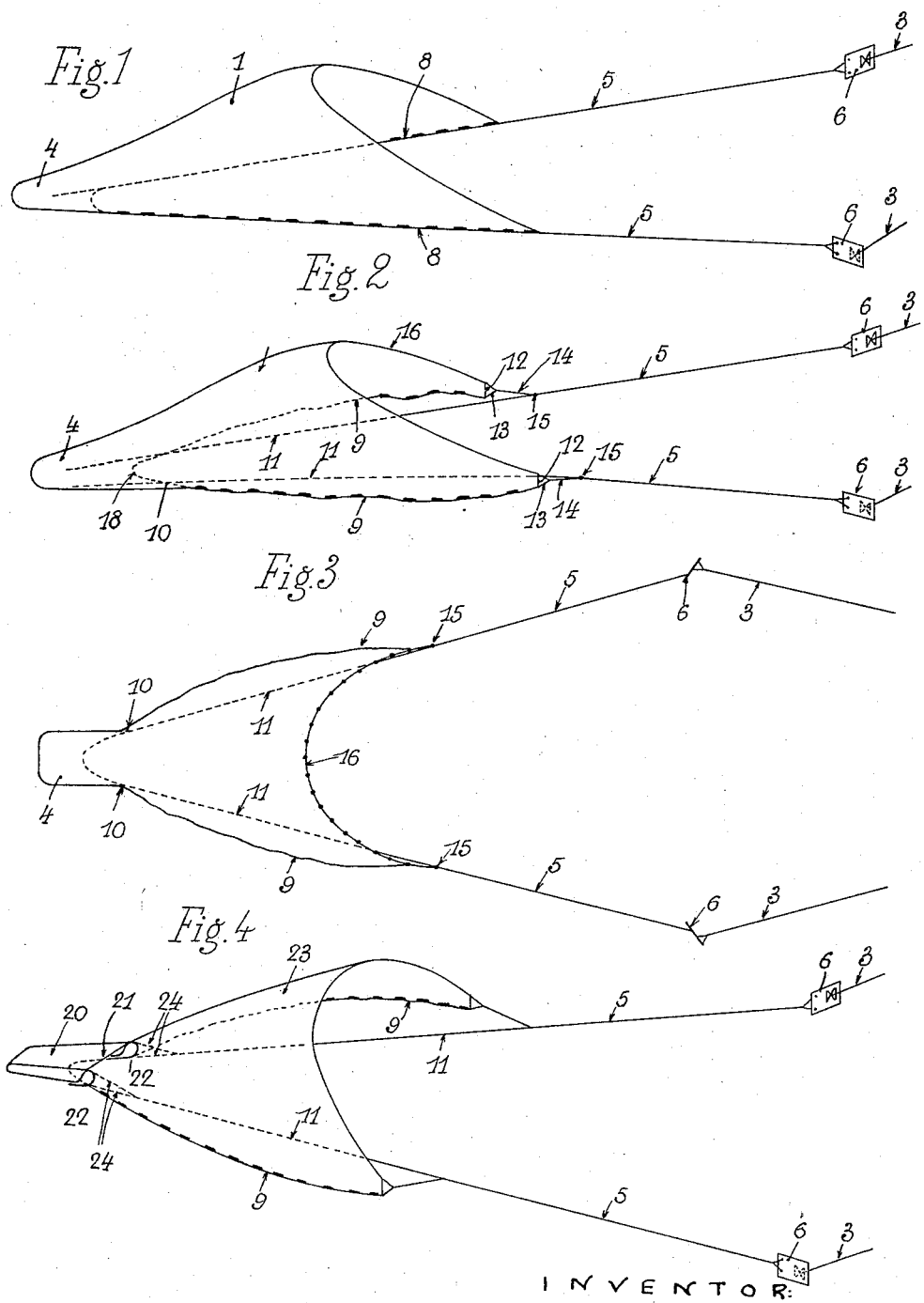

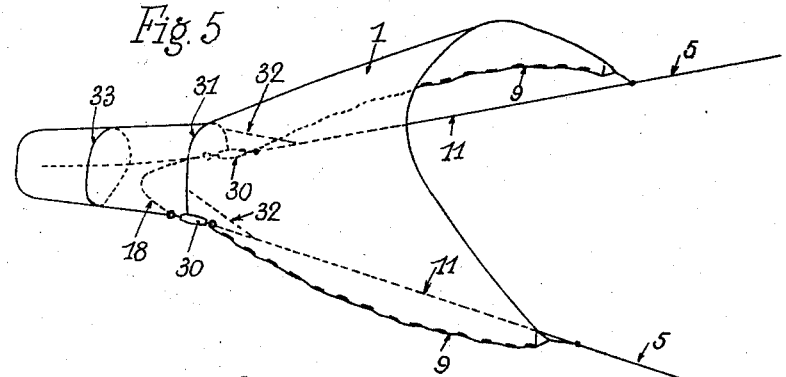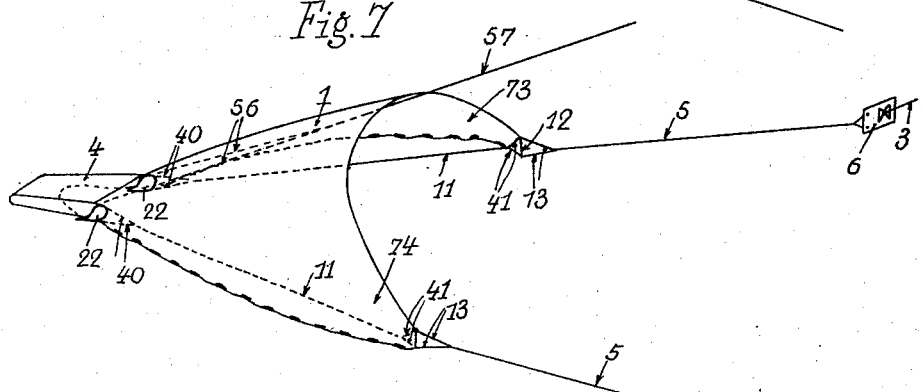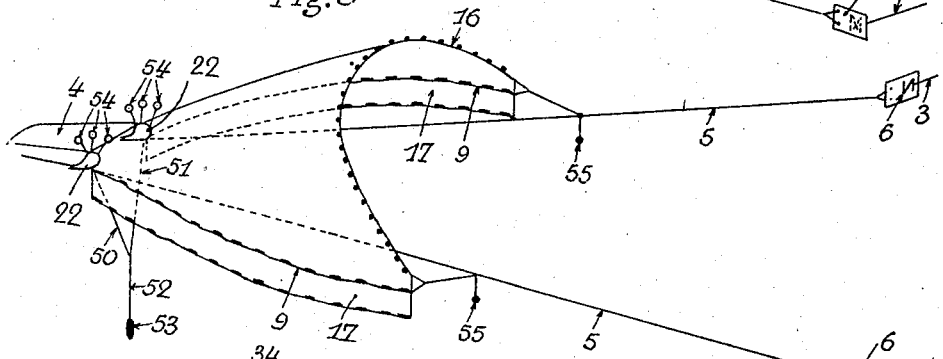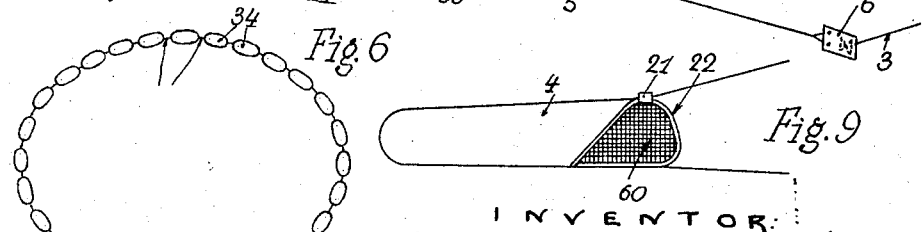

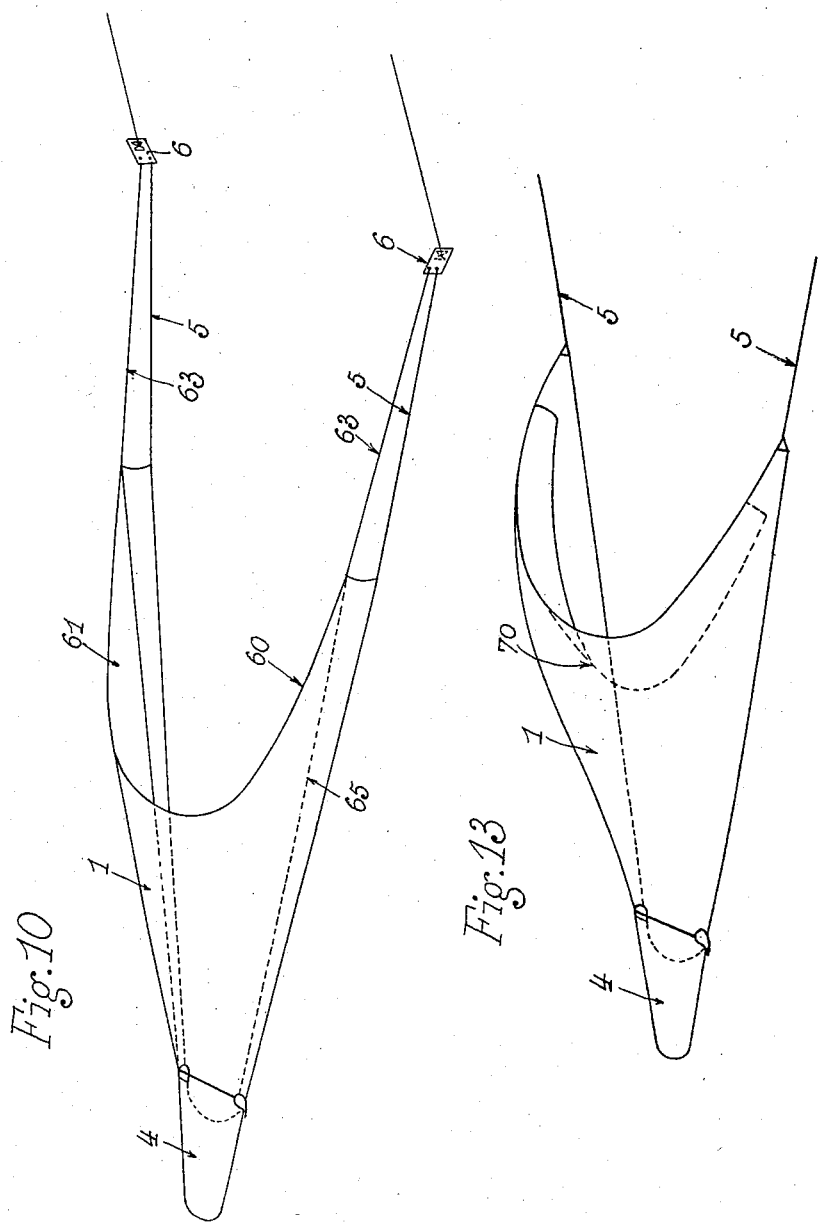

1,812,613

UNITED STATES PATENT OFFICE

JEAN BAPTISTE JOSEPH ALPHONSE VIGNERON, OF LA ROCHELLE, FRANCE, ASSIGNOR TO V. D. LIMITED, OF LONDON, ENGLAND

TRAWLING GEAR

Application filed November 22, 1929, Serial No. 409,065, and in France December 4, 1928.

The present invention relates to trawling gears for sea bottom fishing, and chiefly to fishing gears of the V. D. type, that is, comprising a net adapted to bulge upwardly, whose wings are connected by dragging cables of great length to shear boards adapted to provide for the spreading of the gear in width.

In the known forms of the V. D. gear, as well as in all fishing nets in general, the ground or foot rope of the net, which is properly ballasted, is stretched across the direction of travel, as well as the lower part or belly of the net to which is attached said ground rope, and said belly and foot rope drag upon the sea bottom. When the ground is rough or rocky, the ground rope and the belly of the net catch upon the obstacles, thus causing deformation of the net and reducing the fishing output; damage also very often occurs and the belly of the net is subject to rapid wear. When the ground is covered with rocks or stones, or when it is muddy or covered with vegetation, the ground rope collects such foreign bodies, which pass over the belly of the net, thus wearing the same, and then accumulate in the net pocket and add to its weight, thus increasing the resistance to forward travel as well as the fuel consumption of the trawler and the damages. An additional traction is also exercised upon all the meshes of the net, which prevents them from remaining fully open, whereby the evacuation of water, stones, small fish and the like is rendered more difficult.

The present invention has for its object to obviate all such drawbacks, and for this purpose, the usual lower part or belly of the net and foot rope are eliminated; however this desirable elimination can only be effected provided the proper stability of the net is secured and a proper closure or seal is formed along the sides of the net, between these and the ground, in order to prevent the escape of the fish and thus serve the purpose of the ground rope without offering its drawbacks. To obtain this result, the net is limited on each side by a lateral border weighted cable which may also constitute the extension of the traction cable to the rear pocket, but which is preferably disposed in such manner that it is not subjected to any traction stress and is thus able to constantly follow the outline of the ground, due to its ballasting members. By this means, said traction cable for the rear pocket (whether free or serving at the same time as lateral border cable of the net) is always well stretched in line with the net cable, thus securing the proper stability of the net upon the ground; on the other hand, the lateral border cable of the net (whether free or coinciding with the traction cable for the rear pocket) will always operate in contact with the ground and prevent the escape of the fish.

Said traction cables for the rear pocket are preferably independent of the main body of the net, save at two (or more) attaching points, one at the end of the wings and the other at the front of the rear pocket, thus providing for the lateral bulging of the net, by reason of the slack given to the border cable. This bulging greatly assists in the proper opening of the meshes of the net, and hence the evacuation of the water, small fish and detritus, etc., and it also reduces the deformation of the net due to a change in the direction of the trawler or to a defective construction of the net Another drawback of the usual nets is as follows: At the beginning of the fishing operation, when the rear pocket is empty and offers no great resistance to the forward travel, the meshes of the net are well open, thus providing for the normal discharge of the water, sand, mud, small fish, and the like, but, as the rear pocket becomes loaded with fish and detritus, it produces an increasing traction force upon the main body of the net, thus tending to close the meshes of the net;

hence, the trawling gear offers an increasing resistance to travel, as the water is prevented from properly flowing out of the net; on the other hand, the net collects an increasing amount of mud and detritus, as well as small fish which are thus destroyed to no avail. This accumulation of detritus increases the weight of the rear parts of the net, and hence the friction on the ground and the resulting wear, this being finally represented by a great expenditure of fuel and material, as well as a destruction of fishing resources, and a material loss of fish escaping through the torn parts of the net.

In order to obtain a constant opening of the meshes of the net body, an important feature of the invention consists in providing the rear pocket of the net with a rigid frame which secures its proper opening and which is directly attached to suitable traction members, so that the rear pocket will exercise no traction force upon the main body of the net; the meshes of the net body, which are now quite relieved of all traction, will remain open and preserve the proper shape even when the meshes of the rear pocket are closed due to the accumulation of fish and detritus.

Another defect inherent in the known fishing nets resides in that the rear pocket of the net, which drags upon the ground, is subject to a great friction and is rapidly worn out, the major part of the damage to the net occurring in this place.

Another object of the invention is to provide for the ready renewal of the parts of the net which are subject to a more rapid wear than the remainder of the net, and, for this purpose, the rear pocket of the net consists of a removable and interchangeable part which is attached to the main body of the net in a detachable manner.

Obviously, it is advantageous to combine these various features, that is to eliminate the belly and render the rear pocket distinct from the body of the net, in order to prevent the meshes of the latter from closing up, and also removable in such manner that it may be readily replaced when damaged.

Further characteristics of the invention will be specified in the following description, with reference to the accompanying drawings, which show, by way of example, various embodiments of the invention.

Fig. 1 is a perspective view of the trawling gear according to the invention.

Fig. 2 is a similar view of a modified construction.

Fig. 3 is the corresponding plan view.

Figs. 4 and 5 show modifications of Fig. 2.

Fig. 6 shows a detail of construction of a stiffening structure for the rear pocket.

Figs. 7 and 8 are views similar to Fig. 2, showing further modifications.

Fig. 9 shows a detail of construction of the rear pocket.

Fig. 10 is a perspective view of another embodiment of the invention.

Fig. 13 shows a net according to the invention, provided with means for driving the fish towards the rear pocket.

Figure 11:
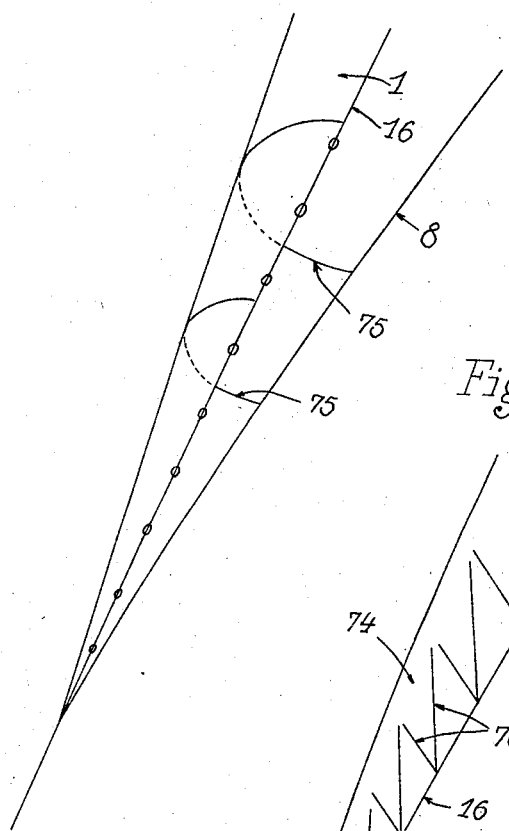
Fig. 11 shows a net wing provided with arcuate members.

The trawling gear shown in Figure 1 is of the V. D. type, that is, comprises a net 1 adapted to bulge upwardly and towed by two hawsers 3—3 and two net cables 5—5 of great length, which are attached to shear boards 6—6 adapted to provide for the spreading of the net in width.

As shown in the drawings, the invention consists essentially in eliminating the usual lower part or belly of the net, and in limiting the net 1 on each side by a weighted border cable 8—8. As above stated, the disposition permits to obviate the drawbacks inherent in the usual ground rope and belly, and it may be sufficient to prevent the escape of the fish under the sides of the net when operating on even and smooth ground.

However, as a general rule, and especially when fishing upon uneven ground, it is preferable to employ the trawling gear shown in Figure 2, wherein the cables 8 are replaced by two separate cables 9 and 11. As represented, one of said cables, or border cable 9, is attached for instance in the rear at 10 to the other cable, or rear pocket cable, which imparts the traction to the rear pocket, and may form an extension of the net cable 5. A swivel (not shown) is preferably disposed on each cable 5 in front of the attaching point 15 or slats 12. At the front part, each border cable 9 may be attached to the base of the usual spreading slat 12, connected by a crow foot 13 and a rope 14 to a point 15 of cable 5. The distance 10—15, or the length of the cable 11, is less than the total length of the border cable 9, the crow foot 13 and the rope 14, and hence the whole of the traction exercised by the rear pocket is supported by the rear pocket cables 11, whilst the border cables have sufficient slack to follow their weighting and thus to bear upon the ground and prevent the escape of the fish under the sides of the net.

Due to this disposition, the following advantages are also obtained:

1. When the border cables 9—9 are distinct from the traction cables 11, as shown in Figure 2, the net may bulge at the side, and this is useful for the discharge of water, small fish and small detritus entering through the mouth of the net. Moreover, the said border cables serve to reduce the deformations of the net when the trawler changes its direction or in the accidental case in which one of the traction cables or hawsers is shorter than the other.

2. By relieving the border cables 9—9 of all traction stress, this obviates the frequent damage occurring when the net catches upon obstacles on the ground or when it takes up rocks, pebbles, etc. As above stated, the usual ground rope is not independent from the net and transmits the traction of the rear pocket, whereby it catches more readily upon such obstacles of the ground and collects in the sides of the net a part of the stones and detritus met on its path; the net is often torn, with a resulting loss of fish. On the contrary, in the gear according to the invention, the cables 11 are adapted solely for traction and are independent from the net, and hence they will never collect stones or the like on the ground and carry these into the net. On the other hand, when the border cables 9—9 meet an obstacle on the ground, they will simply slide over these obstacles without causing resistance, and without catching upon them or without bringing stones or the like into the net. The great advantages of such gear will be fully appreciated, considering that it operates as a screen which retains the fish while allowing all the foreign material of the ground to escape.

This result is also furthered by the good balance of the forces acting on the trawling gear.

3. When the apparatus is hauled on board, the rear pocket may be raised by means of said traction cables, thus obviating the laborious operation of raising the net pocket by hand, mesh by mesh.

It will be observed that the bottom of the rear pocket 4 comprises a cable 18 which is similar to the usual ground rope, but is free from its drawbacks. This cable has a very short length, equal to the width of the rear pocket, (while the known ground rope has generally 30–40 metres length) and thus it will take up only a very small amount of detritus. Furthermore, since it is practically relieved from traction stresses, it will cause less damage by catching on the ground. Finally, it can be readily provided with rollers which will operate in the proper manner due to the direction of said cable and will roll over the obstacles.

The present net having a smaller bulk and weight, its manipulation is greatly facilitated.

The main body or covering sheet of the net has no other purpose than to form a screen which prevents the escape of the fish. The upper part is caused to bulge out by floats or like uplifting means attached to the head rope 16, and by further floats or the like which may be disposed on the top part of the net, thus forming a sort of dome under which the swimming fish are caught.

For fishing upon irregular ground, having holes or depressions, the border cable 9 may be provided at the lower part with a band of netting 17 (Fig. 8) which hangs vertically and is weighted at the bottom by chains or the like, said band adding to the effect of cables 9. Since the cable 11 is distinct from the net, it can be hauled on board by the winch unto the rear pocket, and thus the manipulation of the trawling gear will be much facilitated.

The gear above described may be improved by connecting a rigid or semi-rigid stiffening structure to the front part of the rear pocket and to the cables 11—11 (Fig. 4); said structure preferably consists of a horizontal beam 21 mounted on a pair of shoes 22 and forming a sort of small beam-and-irons trawl 20.

Due to the rigid structure formed by the beam 21 and shoes 22, the whole weight of the rear pocket 20 is imparted to the cables 11, and the part 23 is not subjected to traction, so that it is enabled to bulge to the maximum.

It should be noted that since there is no traction, nor any friction causing wear of the body of the net, this latter may consist of very thin cord, thus still reducing the resistance to forward travel and facilitating the bulging of the net.

As in the usual nets, the sheet of netting forming the rear pocket may form the extension of the sheet of netting forming the main body 1, or it may consist of a separate piece of netting which is permanently secured to said body 1. However, as the rear pocket is the part of the net which is the most rapidly worn out, it is preferable to connect these two parts of the net together in a detachable manner, thus making the rear pocket interchangeable. In practice, it is advantageous to detachably connect the rear edge of the main body 1 to the frame 21—22 of the rear pocket.

In these conditions, the rear pocket may consist of a small trawl net 20 with beam and irons of the usual type, the main body 1 consisting of a kind of half-funnel, which is attached to the cable 11. Due to this arrangement, all damage resulting from the friction on the ground, or from the catching of the net upon obstacles, will be confined to the small beam and irons trawl and thus the repairs will be more readily effected and at a less cost.

Instead of using a beam and irons trawl as the rear pocket, it is possible to employ any suitable pocket whose mouth is provided with a rigid frame; when a beam and irons trawl is employed, its size and shape can be modified to adapt it to such use. Use may also be made of a beam and irons trawl of the usual size and shape.

Use may also be made of the following device (Fig. 5).

The cables 11 of the net pocket and the border cables 9 on each side of the net are attached to one end of a cast iron ballast member having an ovoid shape or the shape of a shoe, or the like; to the opposite end of said member is attached the respective end of the ground rope 18 of the rear pocket, in the same manner that the various cables are attached to the bottom of the shoe 22 in the preceding example.

These two iron members 30, whose weight is appropriate to the size of the fishing gear, tend to move apart with great force; due to their own weight, they tend to operate at the same distance apart as the attaching points of the slats; furthermore, since they travel on the ground in an oblique manner and due to the resistance of the ground, they still tend to move apart.

To assure the complete opening of the meshes of the rear pocket, a rigid curved frame 31 of iron, wood or the like may be secured above said members 30, the meshes of the net being lashed to the said frame, whose size is such that the meshes will be held open to the normal extent. To secure the stability of the said frame, its upper part may be connected with the rear pocket cables 11 by ropes 32—32.

To provide for a certain flexibility for the whole, and to thus facilitate the operation of bringing the rear pocket on board, said rigid arch may be replaced by a kind of string of beads 34 consisting of wooden beads of ovoid shape which are strung upon an ordinary cable or a steel cable 35. The wooden beads are inserted into the meshes of the net, and each bead may correspond to one or more meshes, thus giving the latter their normal opening, while permitting a certain play from front to rear, if so desired.

In order to more completely secure the normal opening of the meshes of the rear pocket and to improve the stability of the latter, said pocket may be provided somewhat in the rear of its ground rope 18, with one or more rigid stiffening members 33 or semi-rigid structure made of wooden beads, as above described.

In the preceding figures, the towing cables 11 are attached to the rear pocket by a crow foot which is so disposed that the said cables will rub upon the ground throughout their entire length. At the points 15 they carry a ring to which is attached the rope 14 or the crow foot 13 of the slat 12.

This construction of the trawling gear is preferable when operating on even ground, on which there is less risk of catching upon obstacles.

The construction shown in Figure 7 is preferred for operating upon ground covered with obstacles, and herein the cable 11 is somewhat raised above the bottom and is less likely to catch upon obstacles; for this purpose, the cables 11 are attached to the shoes 22 of the beam-and-irons trawl and to the slats 12 of the net by two crow foot connections 40—41 having equal branches, the slats 12 being connected by the crow foot connections 13 to the cables 5. The ropes 11 may be provided with wooden rollers for raising them above obstacles of the ground.

Various modifications may be made without departing from the principle of the invention.

In particular, with a large rear pocket, said pocket may be drawn directly by the trawler (Fig. 7) by means of a crow foot 56 and a hawser 57, thus giving a certain slack to the cables 5 by which they will fit more closely upon irregular ground; due to this arrangement, the size of the shear boards may be materially reduced, since they are not subject to the traction force of the net. The hawsers 3 may be attached to the hawser 57, or they may run through a ring attached to said hawser, etc.

The main body of the net may have any suitable shape and particularly, as herein represented, the front part may be cut out so as to form a pair of wings 73—74. Said body consists of several parts assembled together, and it may have any suitable dimensions.

Obviously, it is necessary to attach said net body to the rigid frame of the pocket, in such manner as to prevent the fish from escaping, although the meshes of the main body are still relieved from the traction of said pocket.

The space 60 between the shoes 22 at the mouth of the rear pocket (Fig. 9) can be closed up by wire netting or other openwork structure, of the proper size of meshes for the exit of the small fish and detritus.

The parts of the net secured to the beam and which have to withstand heavy strains will preferably be made of double mesh netting.

The upper part of the rear pocket may be provided with floats, so as to bulge it out and to prevent the escape or crushing of the fish which are still alive. The shoes 22 and the lower part of the small net 20 may be weighted in order to assure the constant contact of the rear pocket with the ground.

For the proper contact of the various dragging cables (5, 8, 9, 11) with the ground, they may carry upon a portion of their length or upon their whole length, suitable weighting elements which are imbedded in rope protecting coils, in order to eliminate all empty spaces between two consecutive weights.

The proper contact with the ground may also be assured by designing the bulged parts of the net outside of the border cables in such manner that they will bear or press upon the ground by reason of the pressure of the water which escapes through the meshes and will aid in preventing the net from leaving the ground and in sealing the space between the border cables and the ground. This lateral bulging may be facilitated by disposing at intervals suitable hoops or curved pieces of wood or the like 75 (Fig. 11).

The outwardly extending parts of the net body which are adapted to bulge and rub upon the ground may be strengthened by several rows of double meshes, thus increasing the strength and the resistance to the flow of the water, in such manner as to amplify the downward pressure exercised by the water upon such parts.

Figure 12:
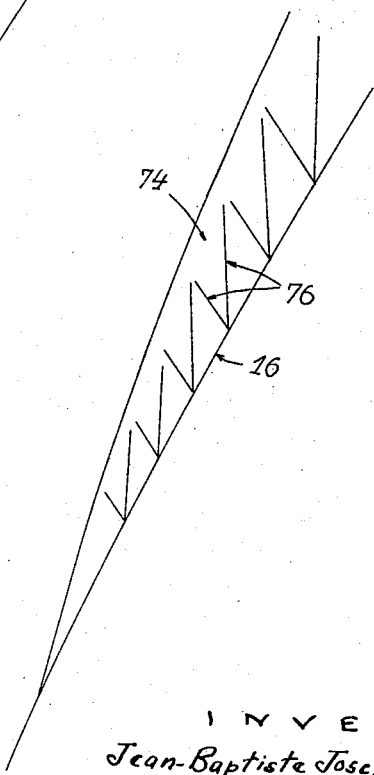
Fig. 12 is a horizontal section of a net wing provided with means for preventing the escape of the fish.

This lateral bulging of the main body facilitates the capture of the flat fish which are expelled from the mud by the border cables 9—9 and are driven into the kind of channel or trough formed by said laterally bulging parts and into the rear pocket. In this particular case of the capture of flat fish, it may be advantageous to dispose in said channel vertical sheets or screens of netting 76 (Fig. 12) which act to direct the fish into said lateral channels and to prevent them from again burrowing into the mud in the middle part of the net.

As shown in Figure 10, the body 1 of the net may be extended by very wide wings 60—61, whose upper parts are attached to cables 5, at a considerable distance from the net, or to the corresponding shear boards 6—6, by upper cables 63—63. In this case, the main body 1 of the net may be provided with usual side cables 65.

In the case where the end of the head rope is attached to cables 5, swivels are preferably mounted at the attaching points, as above stated. To prevent said upper cables 63—63 from entangling with cables 5, the strands of the former are preferably twisted in the contrary direction to those of the lower cables 5.

Instead of mounting the shear boards at a considerable distance from the net, such boards may be directly attached to the ends of the wings as in the ottertrawl gear. Small wing boards may also be mounted at the ends of the wings for increasing the lateral spreading of the net itself and hence the fishing power, especially for flat fish; however such small boards will be unable to stretch the head rope laterally and to thus reduce the upward bulging of the net. The two main shear boards for spreading the scaring cables of the gear are still situated at a great distance from the net, thus causing the cables 5 to converge towards the net for directing the fish into the latter.

Certain fish which are particularly agile may, after entering the net, remain at the upper part instead of proceeding into the rear pocket, and, since this upper part is situated in clear water, these fish are liable to escape. To obviate such drawback and to drive the fish to the rear part in which the water is troubled by clouds of mud raised by the cables, shear boards, etc., whereby the fish are blinded and cannot escape, a suitable sheet or screen 70 (Fig. 13) may be arranged at the mouth of the net. The said sheet is more or less inclined to the rear, in such manner as to guide the fish in the best conditions, and it is so disposed that its lower edge is approximately at the upper limit of the region of the troubled water.

The provision of such a screen in the net according to the present invention affords a special advantage due to the fact that the net is herein entirely or partially deprived of bottom part of belly because the fish which entered the net below the covering sheet during the last end of the fishing operation and have not yet entered the rear pocket, will more readily escape from a net without belly, when the net is hauled on board, than with a net having a belly of large size.

Experience has shown that, by rough weather, the trawling gear according to the invention has some difficulty in taking its position on the ground in the proper manner, and that it sometimes overturns when launched in the water.

In the usual nets which form an actual funnel, the water runs into the net about equally at all points when the net is towed in the water, and the net is thus properly swelled out and reaches the bottom in good position.

On the contrary, with the present net, the elimination of the lower part or belly occasions a certain lack of balance. This can be obviated, as shown in Figure 8, by the use of a balancing device of the following construction.

To the lower part of the shoes 22, at the mouth of the rear pocket 4, are attached two cables 50—51 of equal length, which are connected at their lower ends to a cable 52 whose lower part carries a weight 53; a chain or like means may be substituted for the said cable 52. To the upper part of the said shoes are attached floats 54, either directly or in the same manner as the weight 53. If necessary, weights 55 may be disposed at the points 15 of the cables 5.

This apparatus, cooperating with the floats of the head rope and with the ballasting of the cables 9, will assure the proper stability of the net when it is launched in the water, and the net is no longer liable to overturn.

The said device does not interfere with a proper fishing since it will only rub upon the ground below the rear pocket; however, to prevent the cables 50, 51, 52 from causing damage when catching upon the obstacles on the ground, they may consist of cords of small strength in order to break when encountering a certain resistance. The ballast 53 may consists of a stone, an old grate bar or other object of little or no value.

Obviously, the various devices herein described are given solely by way of example. The invention is applicable to ottertrawl gears as well as to "boeuf" fishing, in which the hawsers of the net are towed by two trawlers.

Having now described my invention what I claim as new and desire to secure by Letters Patent is:

1. A sea bottom trawling gear comprising in combination: towing means, two shear boards connected with said towing means for spreading the gear in width, two dragging cables of great length connected with said shear boards, a net connected to said dragging cables, said net comprising a rear pocket and a covering sheet and having no belly nor foot rope, and weighted cables bordering the lower edges of said covering sheet and adapted to seal the joint between said covering sheet and the ground.

2. A sea bottom trawling gear comprising in combination: towing means, two shear boards connected with said towing means for spreading the gear in width, two dragging cables of great length connected with said shear boards, a net connected to said dragging cables, said net comprising a rear pocket and a covering sheet and having no belly nor foot rope, traction cables attached to said rear pocket at one end to said dragging cables at the opposite end, and weighted slack cables bordering the lower edges of said covering sheet and so connected with said traction cables as to be relieved from traction stresses.

3. A trawling gear as claimed in claim 2, wherein said traction cables are distinct from the body of the net, said weighted cables being attached to said traction cables at points separated by distances less than the lengths of the corresponding portions of said weighted cables, whereby said net is allowed to bulge out laterally.

4. In a trawling gear, towing means, a beam and irons trawl, means for detachably connecting said trawl with said towing means, and a covering sheet detachably connected with said trawl and said towing means.

5. In a trawling gear, two traction cables, a beam and irons trawl attached to said traction cables, and a half-funnel-shaped covering sheet attached at its rear edge to said trawl and at its front corners at least to said traction cables.

6. In a trawling gear, two towing hawsers, two dragging cables, shear boards between said hawsers and cables, a net comprising a rear pocket, a rigid structure attached at the front end thereof, traction cables for directly connecting said rigid structure to said hawsers, and a covering sheet attached to said rear pocket and said dragging cables.

7. A trawling gear as claimed in claim 2, wherein said traction cables are distinct from the body of the net, said weighted cables being attached to said traction cables at points separated by distances less than the lengths of the corresponding portions of said weighted cables, whereby said net is allowed to bulge out laterally, and arcuate members attached to the lateral parts of said net, within the lateral bulged parts thereof, for the purpose set forth.

8. In a trawling gear as claimed in claim 1, bands of net fabric suspended from said weighted cables and whose lower edges are provided with weighted border ropes so attached to said weighted cables as to be relieved from traction stresses.

In testimony whereof I have signed my name to this specification.

JEAN BAPTISTE JOSEPH ALPHONSE VIGNERON.